(12) United States Patent
Atkins et al.

(10) Patent No.: US 6,955,638 B1
(45) Date of Patent: Oct. 18, 2005

(54) PROCESS FOR DISPOSING OF SOLVENT-CONTAINING LIQUIDS

(76) Inventors: Don C. Atkins, 10891 Portal Dr., Los Alamitos, CA (US) 90720; Steven H. Bortz, 1461 Red Sail Cir., Westlake Village, CA (US) 91361

( * ) Notice: Subject to any disclaimer, the term of this patent is extended or adjusted under 35 U.S.C. 154(b) by 308 days.

(21) Appl. No.: 10/429,842

(22) Filed: May 6, 2003

Related U.S. Application Data

(63) Continuation-in-part of application No. 09/829,204, filed on Apr. 9, 2001, now abandoned.

(51) Int. Cl.⁷ .................................. A62D 3/00
(52) U.S. Cl. ............... 588/255; 588/252; 588/256; 44/271; 264/4.3; 264/4.7
(58) Field of Search ............... 588/205, 218, 588/236, 252, 255, 256; 44/271; 264/4.3, 264/4.7; 405/129.65; 210/755; 252/635

(56) References Cited

U.S. PATENT DOCUMENTS

| | | | | |
|---|---|---|---|---|
| 3,872,023 A | * | 3/1975 | Baum et al. | 428/402.22 |
| 3,881,295 A | * | 5/1975 | Derby | 110/346 |
| 4,003,846 A | * | 1/1977 | Kuhn et al. | 264/4.7 |
| 4,131,563 A | * | 12/1978 | Bahr et al. | 588/252 |
| 4,234,632 A | * | 11/1980 | Lubowitz | 264/115 |
| 4,353,809 A | * | 10/1982 | Hoshi et al. | 264/4.7 |
| 4,443,576 A | * | 4/1984 | Bhattacharyya et al. | 524/522 |
| 4,460,292 A | * | 7/1984 | Durham et al. | 175/66 |
| 5,211,858 A | * | 5/1993 | Dovan et al. | 166/295 |
| 5,380,308 A | * | 1/1995 | Gunya et al. | 116/215 |
| 5,546,798 A | * | 8/1996 | Collee et al. | 73/152.09 |
| 5,608,137 A | * | 3/1997 | Wilkins | 405/128.5 |
| 5,617,920 A | * | 4/1997 | Dovan et al. | 166/295 |
| 5,663,477 A | * | 9/1997 | Honeycutt | 210/925 |
| 5,678,238 A | * | 10/1997 | Billings et al. | 134/29 |
| 5,997,946 A | * | 12/1999 | Bell et al. | 264/4.1 |
| 6,383,398 B2 | * | 5/2002 | Amer | 210/710 |

FOREIGN PATENT DOCUMENTS

FR 2722522 A * 1/1996

* cited by examiner

*Primary Examiner*—Stanley S. Silverman
*Assistant Examiner*—Peter J Lish
(74) *Attorney, Agent, or Firm*—Edgar W. Averill, Jr.

(57) ABSTRACT

A process for disposing of solvent-containing liquids so that they do not contaminate ground water. An absorbent blend is mixed into a water-containing solvent mixture at the rate of about 1 lb. of blend per gallon of liquid. The blend is made up of a swellable polymer, consisting of polyacrylamide/polyacrylate co-polymer salt or poly 2-propenamide-co-2-propenoic acid homopolymer salt which swells and absorbs liquid. The blend also contains a mixture of solid absorbents. The resulting mixture is stirred in the container until it becomes thick and then it is allowed to set to provide a disposable modeling clay-like solid. The resulting solid material, after curing, may be then simply added to solid trash, and thus, be freed from contaminating ground water.

9 Claims, No Drawings

PROCESS FOR DISPOSING OF SOLVENT-CONTAINING LIQUIDS

CROSS-REFERENCE TO RELATED APPLICATIONS

This application is a continuation-in-part of applicant's application Ser. No. 09/829,204 filed Apr. 9, 2001 now abandoned.

BACKGROUND OF THE INVENTION

The field of the invention is cleaning liquid disposal and the invention relates more particularly to the disposal of solid and solvent-containing liquids. Non-aqueous solvent-containing liquids are produced by many industrial and commercial cleaning processes and one particularly egregious problem results from the cleaning of paint equipment (i.e. brushes) since this is done on such a large scale throughout the country. Typically, the cleaning of paint from paint brushes and equipment is accomplished with the use of water-based cleaners and/or solvent-based mixtures, such as acetone, methylethyl ketone, toluene, or blends of hydrocarbons. Unfortunately, the typical painter dumps the paint brush cleaning water and/or solvent mixture onto the ground wherein it can seep into the ground water. Alternatively, sometimes the waste solvent from paint brush cleaning is poured down the drain into the municipal sewer system where it is a source of contamination and such dumping typically is prohibited by law, but unfortunately, it is a law that is very difficult to enforce.

There is, thus, a need for a process which will permit the painter, or other possessor of solvent-containing liquids, to economically and easily dispose of such liquids without breaking the law or contaminating the ground water.

BRIEF SUMMARY OF THE INVENTION

It is an object of the present invention to provide a process for turning a solid and solvent-containing liquid into a solid which may be disposed of without contaminating ground water.

The present invention is for a process for disposing of solid and solvent-containing liquid comprising the steps of transferring at least a portion of the solvent-containing liquid to a container and adding sufficient water to bring the water content up to about 50% by weight. Preferably, the water is soft or deionized water. Next, a combination of an adsorbent/absorbent-containing blend is mixed into the water/solvent-containing mixture. The adsorbent/absorbent mixture comprises about 25% by weight to 50% by weight of a swellable polymer consisting of polyacrylamide/polyacrylate co-polymer salt or poly 2 propenamide-co-2-propenoic acid homopolymer salt, between about 75% by weight and 50% by weight of a solidifying mixture comprising at least two of the group consisting of calcium oxide, aluminum oxides, calcium sulfate, silicon oxide, perlite, pumice, activated carbon, surfactants and ground corn cobs. This mixture is stirred until it is thick and then allowed to cure for a cure time sufficient to provide a disposable modeling clay-like solid. The term "swellable polymer" as used herein is intended to mean polyacrylamide/polyacrylate co-polymer salt or poly 2 propenamide-co-2-propenoic acid homopolymer salt or mixture thereof. Preferably a bacterial culture, either derived from a culture or indirectly from enzymatic action, would be included to consume solvents in the solid. All percentages contained in the specification or claims are intended to indicate percent by weight.

DESCRIPTION OF THE PREFERRED EMBODIMENTS

It is desirable to prevent solvents and cleaning solutions from contaminating ground water. Such contamination occurs when potentially contaminating liquids are disposed of by simply pouring them on the ground. One way of preventing such contamination is to convert the residue solvents into a solid material which then may be disposed of with other solid disposables. Solvent-containing materials are produced from a number of commercial, industrial, and home cleaning processes and an especially common source of solvent-containing liquid disposal results from the cleaning of paint brushes and equipment. The typical painter, of course, is required to clean his or her paint brushes because of the expense of such items. It is conventional for painters to pour the cleaning solvent into a container, such as a five gallon plastic pail. Frequently, the painter will simply pour the spent mixture onto the ground, not giving heed to environmental concerns.

The process of the present invention uses a unique blend of relatively innocuous materials which, when combined in the proper proportions with the cleaning solutions, offers the painter, and particularly the commercial painter, a relatively inexpensive, safe, and quick way to dispose of unwanted residues of the painting process. Cleaning solutions often contain water and an insoluble solvent, as well as solids. The process of the present invention includes adding a mixture which contains a surfactant, which causes the two phase liquid cleaning solution to be primarily solubilized into a one phase liquid solution. The mixture used in the process of the present invention is mixed with the cleaning solution and stirred until thickened. Then it is allowed to set into a solid substance which has the consistency of potter's clay or modeling clay. Preferably, the thickened material is allowed to cure for one week or more, depending on the quantity and nature of solvents, after which it can be disposed of with other waste solids.

The blend of materials which is capable of solidifying the water-containing solvent/solid residue mixture is made up of the following materials:

1. Between about 25% and 50% by weight of a swellable polymer consisting of a polyacrylamide/polyacrylate co-polymer salt and a poly 2 propenamide-co-2-propenoic acid homopolymer salt.

2. Between about 75% and 50% by weight of a solidifying mixture comprising at least two of the group consisting of calcium oxide, aluminum oxides, calcium sulfate, silicon oxide, pumice, perlite, activated carbon and ground corn cobs.

3. Sufficient surfactant to primarily solubilize two phase liquid mixtures.

The amount of surfactant required is preferably between 1% and 10% by weight and is selected from the group consisting of alkanolamides, alkyl sulfonates, amine oxides, ethoxylated oxide alcohols and copolymers of propylene oxide and ethylene oxide. Percentages referred to herein are percent by weight.

The swellable polymer consisting of polyacrylamide/polyacrylate co-polymer salt and/or poly 2 propenamide-co-2-propenoic acid homopolymer salt tends to swell and absorb the water/solvent liquid. The blend of solid materials also tends to absorb and solidify the mixture. In place of the polyacrylamide/polyacrylate co-polymer, 2 propenamide-co-2 propenoic acid homopolymer may be used. Alternatively, a mixture of these swellable polymers may be used. Activated carbon has the property of absorbing hydrocarbons.

The surfactant is preferably chosen from several general types. One such type is alkanolamides, such as cocodiethanolamide, one type of which is sold under the trademark "Carsamide CA." Another type of surfactant includes alkyl sulfonates, such as sodium alkyl aryl sulfonate, such as that sold under the trademark "Calsoft F-90." Another surfactant type is amine oxides, such as cocoamideopropyl amine oxide, such as that sold under the trademark "Jordamox CAPA." Another surfactant type is ethoxylated alcohols, such as ethoxylated nonyl phenol, or octylphenoxy polyethoxy ethanol, which are sold under the trademarks "Norfox NP-9" and "Triton X-45," respectively. Block polymer surfactants also can be used, such as copolymers of propylene oxide and ethylene oxide, such as that sold under the trademark "Pluronic L-61."

In addition to adding a surfactant, it is preferable to add a material which will complex any heavy metals (within U.S. government standards), such as zinc, vanadium, tungsten, tin, nickel, mercury, manganese, and lead, so that such undesirable metals will not pass into the ground water in any form. One material which will insolubilize these metals is sodium sulfide, and this is preferably included in the blend for that purpose.

A further preferred ingredient is a bacterial culture and/or appropriate enzymes as part of the dry blend of materials. About 1% or less of bacillus spores is sufficient to "chew on" or otherwise consume hydrocarbon solvents. One such culture is sold under the trademark "Bi-Chem SM-700" by Sybron Chemicals, Inc. Another culture is sold under the trademark "AHR Hydrocarbon" by Sybron Chemicals, Inc., which alternatively is typical of the type of culture which is known to consume hydrocarbon solvents.

Thus, the process for solidifying a liquid solvent may be summarized by three simple steps. The first is, the solvent is combined in proportions of one-half water and one-half cleaning liquids containing solid residue in an empty five gallon bucket, leaving enough room for mixing the addition of the solid-forming blend. Step two is stirring thoroughly while adding about one pound of blend per gallon of liquid, preferably added slowly while mixing. Step three is continuing to stir until the mixture thickens, after which the thickened mixture is allowed to cure for approximately a week for each gallon prior to disposal. The resulting product may then simply be thrown away with other solid waste materials, and will, thus, not drain into the ground water system.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

We claim:

1. A process for disposing of solvent-containing liquids comprising:
    transferring at least a portion of said solvent-containing liquid to a container;
    adding sufficient water to said solvent-containing liquid to bring the water content of the liquid to at least about 50% by weight to provide a water/solvent-containing mixture;
    mixing a combination of an adsorbent/absorbent-containing blend to said water/solvent-containing mixture to provide a solvent/absorbent mixture, said adsorbent/absorbent-containing blend comprising:
    between about 25% and 50% by weight of a swellable polymer consisting of polyacrylamide/polyacrylate co-polymer salt or poly 2 propenamide-co-2-propenoic acid homopolymer salt;
    between about 75% and 50% by weight of a solidifying mixture comprising at least two of the group consisting of calcium oxide, aluminum oxides, calcium sulfate, silicon oxide, pumice, perlite, activated carbon, surfactant, and ground corn cobs;
    continue to mix said solvent/absorbent mixture until thick; and
    allow said solvent/absorbent mixture to cure for a cure-time sufficient to provide a disposable modeling clay-like solid.

2. The process of claim 1 wherein said cure-time is about one week.

3. The process of claim 1 further including the step of adding a heavy metals non-leaching agent comprising sodium sulfide.

4. The process of claim 1 wherein said solidifying mixture is a solidifying mixture of a plurality of oxides selected from the group consisting of calcium oxide, aluminum oxides, calcium sulfate, and silicon oxide.

5. The process of claim 1 wherein about one pound of said adsorbent/absorbent-containing blend is mixed per one gallon of said water/solvent-containing mixture.

6. The process of claim 1 wherein said adsorbent/absorbent-containing blend includes between 1% and 10% by weight of a surfactant, said surfactant selected from the group consisting of alkanolamides, alkyl sulfonates, amine oxides, ethoxylated alcohols and copolymers of propylene oxide and ethylene oxide to assist in solubilizing insoluble liquids.

7. The process of claim 1 further including a bacterial culture having the property of consuming hydrocarbon solvents.

8. A process for disposing of solvent-containing liquids comprising:
    transferring at least a portion of said solvent-containing liquid to a container;
    adding sufficient soft water to said solvent-containing liquid to bring the water content of the liquid to at least about 50% by weight to provide a water/solvent-containing mixture;
    mixing a combination of an adsorbent/absorbent-containing blend to said water/solvent-containing mixture to provide a solvent/absorbent mixture, said adsorbent/absorbent-containing blend comprising:
    between about 1% and 10% by weight of a surfactant selected from the group consisting of alkanolamides, alkyl sulfonates, amine oxides, ethoxylated alcohols and copolymers of propylene oxide and ethylene oxide;

between about 25% and 50% by weight of a swellable polymer consisting of polyacrylamide/polyacrylate co-polymer salt or poly 2 propenamide-co-2-propenoic acid homopolymer salt;

between about 75% and 50% by weight of a solidifying mixture comprising at least two of the group consisting of calcium oxides, aluminum oxides, calcium sulfate, silicon oxide, perlite, pumice, activated carbon and ground corn cobs;

continue to mix said solvent/absorbent mixture until thick; and allow said solvent/absorbent mixture to cure for a cure-time sufficient to provide a disposable modeling clay-like solid.

9. The process of claim 8 further including the step of adding a heavy metals non-leaching agent comprising sodium sulfide.

* * * * *